United States Patent
Yin et al.

(10) Patent No.: US 6,838,503 B2
(45) Date of Patent: Jan. 4, 2005

(54) FLAME-RETARDANT COMPOSITION AND ARTICLE

(75) Inventors: Ming Yin, Utsunomiya (JP); Takuro Kitamura, Moka (JP); Atsuo Oshiro, Hatchioji (JP); Kenichi Ishiwa, Oyama (JP); Kazunari Kosaka, Mibu-machi (JP); Hiroshi Kubo, Moka (JP)

(73) Assignee: General Electric Compa, Pittsfield, MA (US)

( * ) Notice: Subject to any disclaimer, the term of this patent is extended or adjusted under 35 U.S.C. 154(b) by 193 days.

(21) Appl. No.: 10/186,134

(22) Filed: Jun. 28, 2002

(65) Prior Publication Data

US 2003/0055138 A1 Mar. 20, 2003

(30) Foreign Application Priority Data

Jul. 3, 2001 (JP) ........................................ 2001-202291

(51) Int. Cl.⁷ .......................... C08K 3/38; C08K 5/521
(52) U.S. Cl. ........................ 524/404; 524/127; 524/140; 524/141; 524/143; 524/145; 524/416
(58) Field of Search ..................... 524/127, 140–141, 524/143, 145, 404, 416, 415

(56) References Cited

U.S. PATENT DOCUMENTS

| | | |
|---|---|---|
| 3,333,024 A | 7/1967 | Haefele et al. |
| 3,361,851 A | 1/1968 | Gowan |
| 3,383,435 A | 5/1968 | Cizek |
| 3,994,856 A | 11/1976 | Katchman et al. |
| 4,501,857 A | 2/1985 | Kishimoto et al. |
| 5,102,931 A | 4/1992 | Fuhr et al. |
| 5,693,700 A | 12/1997 | Venkataramani et al. |
| 5,714,550 A | 2/1998 | Shaw |
| 6,228,912 B1 | 5/2001 | Campbell et al. |
| 6,423,768 B1 | 7/2002 | Khouri |
| 6,433,046 B1 | 8/2002 | Campbell et al. |

FOREIGN PATENT DOCUMENTS

| | | |
|---|---|---|
| EP | 0 714 951 | 11/1994 |
| EP | 0 985 706 | 3/1999 |
| JP | 09-309987 | * 12/1997 |

OTHER PUBLICATIONS

International Search Report Dated Nov. 6, 2002.
Derwent Abstract for JP 42–008704.
Derwent Abstract for JP 09–309987.

* cited by examiner

Primary Examiner—Peter Szekely

(57) ABSTRACT

A resin composition useful for wire and cable covering material is formed by compounding a phosphate ester retardant, boron phosphate, and zinc borate hydrate with a polyphenylene ether group resin or a combination of a polyphenylene ether group resin and an aromatic vinyl group resin, in a specific ratio.

9 Claims, No Drawings

FLAME-RETARDANT COMPOSITION AND ARTICLE

BACKGROUND

The present invention relates to a flame retardant resin composition for use in wire and cable covering material. More specifically, the present invention relates to a flame retardant resin composition for use in wire and cable covering material that has excellent flame retardancy using non-halogenated materials, especially in the absence of explosion at the time of combustion or dripping of the resin, and has excellent processability, heat resistance, impact strength, and flexibility.

Polyphenylene ether has excellent mechanical properties, electrical properties, heat resistance, and low temperature properties, as well as low moisture absorbance and excellent dimensional stability. However, it is deficient in molding processability and impact strength, and these problems are solved by blending it with polystyrene or high impact polystyrene to produce compositions that are widely used, for example, in electric and electronic parts, office device housings, automobile parts, precision parts, various industrial parts, etc. The classic polyphenylene ether resin composition formed from polyphenylene ether and high impact polystyrene (see U.S. Pat. No. 3,383,435) has improved impact strength, however its chemical resistance is deteriorated.

Due to this, improvement of solvent resistance and impact strength based on blending polyphenylene ether and polyolefin has been proposed in U.S. Pat. No. 3,361,851. U.S. Pat. No. 3,994,856 describes improvement of impact strength and solvent resistance based on blending a hydrogenated block copolymer of polyphenylene ether or polyphenylene ether as well as styrene group resin.

In the past, poly(vinyl chloride) resin has been widely used in resin compositions employed as a covering material of wire and cable. The poly(vinyl chloride) resin has anti thermal temperature low at 60° C. and it is also flame retardant. However, since it contains halogen, there is a fear of causing environmental pollution by generation of dioxin, etc. at the time of combustion, and regulations regarding its use have recently become stringent.

Furthermore, there are cases of using tetrafluoroethylene in resin compositions used as a covering material of wire and cables. Tetrafluoroethylene is flame retardant and has the advantage of having drip controlling properties, however, it has the disadvantages of being difficult to mix with other resin compositions and having reduced processability. Also, because of its thermal contractibility (shrinkage), it cannot be used in the 5V test of UL 94 and may be associated with electricity leakage caused by damage of the wire and cable covering material at the time of burning.

In addition to this, tetrafluoroethylene has the problem of causing environmental pollution similar to poly(vinyl chloride) resin mentioned above, since it contains fluorine.

BRIEF SUMMARY

The present invention solves the problems of the techniques of the past mentioned above and provides a resin composition useful for wire and cable covering material having excellent flame retardance using non-halogenated materials, especially in the absence of explosion at the time of combustion or dripping of the resin. The composition also has satisfactory melt properties, and excellent processability, heat resistance, impact strength, and flexibility.

The present inventors carried out various experiments in order to solve the problems mentioned above, and as a result they found that the resin composition obtained by compounding phosphate flame retardant, boron phosphate, and zinc borate hydrate with the polyphenylene ether (called PPE hereafter) resin, optionally in the presence of aromatic vinyl group resin, in a specific ratio gives the covering material of wire and cable excellent flame retardance, especially in the absence of explosion at the time of combustion or dripping of the resin. The composition further exhibits excellent processability, heat resistance, impact strength, and flexibility.

In a first embodiment, a flame retardant resin composition useful in wire and cable covering material comprises (A) 100 parts by weight of polyphenylene ether group resin, or a polyphenylene ether group resin in combination with an aromatic vinyl group resin, (B) 2 to 30 parts by weight of a phosphate ester flame retardant, (C) 0.1 to 20 parts by weight of boron phosphate, and (D) 0.1 to 10 parts by weight of zinc borate hydrate.

In a second embodiment, the flame retardant resin composition useful in wire and cable covering material is as described in the first embodiment, wherein the polyphenylene ether group resin is poly(2,6-dimethyl-1,4-phenylene ether) having an intrinsic viscosity of 0.08 to 0.60 dl/g measured at 30° C. in chloroform as the solvent.

In a third embodiment, the flame retardant resin composition useful in wire and cable covering material is as described above in the first or second embodiments, in which the phosphate ester flame retardant of the component (B) is an aromatic phosphate ester.

In a fourth embodiment, the flame retardant resin composition useful in wire and cable covering material is as described above in any one of the first, second, or third embodiments, wherein the resin composition further comprises (E) a thermoplastic elastomer.

In a fifth embodiment, the flame retardant resin composition useful in wire and cable covering material is described for the fourth embodiment, wherein the thermoplastic elastomer of the component (E) is a hydrogenated block copolymer of styrene and butadiene or a hydrogenated block copolymer of styrene and isoprene.

DETAILED DESCRIPTION OF THE PREFERRED EMBODIMENTS

The present invention has been explained below in further detail.

Polyphenylene ether group resin, or polyphenylene ether group resin in combination with aromatic vinyl group resin (component (A))

In the present invention, well known materials can be used as the PPE group resin of the component (A). Namely, as regards the PPE group resin, generally the polymer has structural units shown by the general formula (I) given below.

[Formula 1]

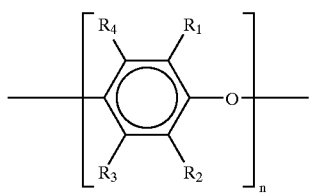

wherein, each of the $R^1$, $R^2$, $R^3$ and $R^4$ is hydrogen, halogen, hydrocarbon radical, substituted hydrocarbon radical, alkoxy radical, cyano radical, phenoxy radical, or nitro radical; and n is an integer showing the degree of polymerization. This can be in form of a homopolymer shown by the general formula given above, or it can be in the form of a copolymer having two or more than two types of phenylene ether units combined. Concrete examples of $R^1$, $R^2$, $R^3$, and $R^4$ radicals include chlorine, bromine, iodine, methyl, ethyl, propyl, allyl, phenyl, benzyl, methyl benzyl, chloromethyl, bromomethyl, cyanoethyl, cyano, methoxy, ethoxy, phenoxy, nitro, etc.

Concrete examples of the PPE group resin include poly (2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly (2,6-dipropyl-1,4-phenylene ether), poly(2-ethyl-6-propyl-1,4-phenylene ether), poly(2,6-dimethoxy -1,4-phenylene ether), poly(2,6-di(chloro methyl)-1,4-phenylene ether), poly(2,6-di(bromo methyl)-1,4-phenylene ether), poly(2,6-diphenyl-1,4-phenylene ether), poly(2,6-ditoluyl -1,4-phenylene ether), poly(2,6-dichloro-1,4-phenylene ether), poly(2,6-dibenzyl-1,4-phenylene ether), poly(2,5-dimethyl-1,4-phenylene ether), etc. Preferred PPE group resins include the polymer having alkyl radicals, particularly, the alkyl radical having 1 to 4 carbon atoms as the $R_1$ and $R_2$ occurring in the formula (I) given above, where n is preferably more than 50. Preferred PPE group resins further include PPE copolymers comprising units in which three alkyls have been substituted in the polyphenylene ether structural units given above, such as copolymers comprising 2,3,6-trimethyl-1,4-phenylene ether units. Also, the copolymer in which a styrene group compound has been grafted to these PPE can also be used. Examples of the styrene group compound suitable for graft polymerizing to the PPE include styrene, alpha-methyl styrene, vinyl toluene, chlorostyrene, etc.

The intrinsic viscosity of the PPE group resin of the present invention measured at 30° C. is chloroform is preferably within the range of 0.08 to 0.60 dl/g. If this intrinsic viscosity becomes less than 0.08 dl/g, then the mechanical strength, elongation, and properties such as heat resistance, etc. of the composition are lowered. On the other hand, if it exceeds 0.60 dl/g, then the processability of the composition remarkably tends to get lowered.

In the present invention, the most desired PPE group resin is poly(2,6-dimethyl-1,4-phenylene ether) having intrinsic viscosity of 0.12 to 0.51 dl/g at 30° C. in chloroform.

In the present invention, the component (A) is the PPE group resin mentioned above or the PPE group resin in combination with an aromatic vinyl group resin. Examples of the aromatic vinyl group resin include homopolymers of styrene or its derivatives, as well as copolymers of styrene and p-methyl styrene, alpha-methyl styrene, alpha-methyl-p-methyl styrene, chlorostyrene, bromostyrene, etc. The rubber-modified polystyrene (HIPS) formed from 70 to 99% by weight of aromatic vinyl compound mentioned above and 1 to 30% by weight of diene rubber, can also be used. Examples of the diene rubber used in HIPS include homopolymers of conjugated diene group compounds such as butadiene, isoprene, chloroprene, etc.; copolymers of conjugated diene group compounds and unsaturated nitro compounds or aromatic vinyl compounds; as well as natural rubber, etc. These can be used in the form of 1 type or in the form of mixture of two or more than two types. Poly butadiene-butadiene-styrene copolymer is particularly preferred. HIPS can be obtained by methods such as emulsification polymerization, suspension polymerization, lump state polymerization, solution polymerization, or by combining these methods. Additional examples of aromatic vinyl group resins include styrene-acrylonitrile-acrylate copolymer, FPDM group rubber-modified polystyrene, acrylate rubber-modified styrene-acrylonitrile copolymer, etc.

In the component (A) of the present invention, PPE group resin and aromatic vinyl group resin can be compounded in any desired proportion. However, usually their compounding ratio is 1 to 99 parts by weight of aromatic vinyl group resin with respect to 99 to 1 parts by weight of PPE group resin. Preferably, aromatic vinyl group resin is used in a quantity within the range from 20 to 80 parts by weight with respect to 80 to 20 parts by weight of PPE group resin.

(2) Phosphate Ester Flame Retardant (Component (B))

In the present invention, examples of the phosphate ester flame retardant component (B) include phosphates such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, dimethyl ethyl phosphate, methyl dibutyl phosphate, ethyl dipropyl phosphate, hydroxyphenyl diphenyl phosphate, etc. or the compounds in which these are substituted by different substitution radicals. As regards the phosphate ester flame retardant that can be used in the resin composition of the present invention, the compound shown by the general formula given below, particularly the one having (A1) to (A4) as R, is preferred from the point of flame retardance and heat resistance. These can be used singly or two or more than two types can be used jointly. In the present invention, a particularly preferred phosphate ester flame retardant is an aromatic phosphate possessing aromatic radicals and having the structure below

[Formula 2]

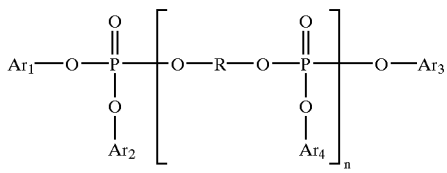

wherein R is a radical chosen from the radicals shown by the formulae (A1) to (A4) given below

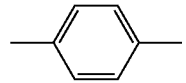

(A1)

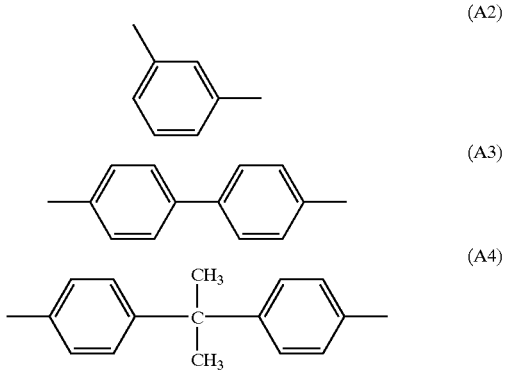

(A2)
(A3)
(A4)

wherein n is an integer from 1 to 10; and wherein each of $Ar_1$ to $Ar_4$ is independently phenyl radical, toluyl radical, or xylyl radical. Also, in case of n being more than 2, $Ar_4$ present in multiple numbers can be identical or different.

The phosphate ester flame retardant that is the component (B) of the present invention is compounded in a quantity within the range from 2 to 30 parts by weight with respect to 100 parts by weight of PPE group resin or PPE group resin in combination with aromatic vinyl group resin of component (A), preferably in a quantity within the range from 5 to 25 parts by weight. If the compounding quantity of component (B) becomes less than 2 parts by weight with respect to 100 parts by weight of component (A), then the flame retardancy of the composition becomes insufficient, and, on the other hand, if it exceeds 30 parts by weight, then the heat resistance of the composition is remarkably lowered.

(3) Boron Phosphate (Component (C))

Boron phosphate that is the component (C) of the present invention is used as the drip prevention reagent of the resin composition of the present invention. The drip prevention reagent is the additive that controls dripping at the time of combustion, and use of polytetrafluoroethylene, etc. is known for this purpose.

Boron phosphate that is the component (C) of the present invention is compounded in a quantity within the range from 0.1 to 20 parts by weight with respect to 100 parts by weight of PPE group resin or the combination of PPE group resin and aromatic vinyl group resin of component (A), preferably in a quantity within the range from 0.5 to 10 parts by weight. If the compounding quantity of component (C) is less than 0.1 parts by weight with respect to 100 parts by weight of component (A), then drip prevention cannot be obtained, and, on the other hand, if it exceeds 20 parts by weight, then impact strength is remarkably lowered.

(4) Zinc Borate Hydrate (Component (D))

Zinc borate hydrate that is the component (D) of the present invention is used as the drip prevention reagent of the resin composition of the present invention similar to the component (C) mentioned above.

Zinc borate hydrate that is the component (D) of the present invention is compounded in a quantity within the range from 0.1 to 10 parts by weight with respect to 100 parts by weight of PPE group resin or aromatic vinyl group resin and the same of component (A), preferably in a quantity within the range from 0.5 to 10 parts by weight. If the compounding quantity of component (C) becomes less than 0.1 parts by weight with respect to 100 parts by weight of component (A), then drip prevention is insufficient, and, on the other hand, if it exceeds 10 parts by weight, then the flame retardance of the resin composition tends to be reduced.

(5) Thermoplastic Elastomer (Component (E))

In addition to the components (A) to (D) mentioned above, thermoplastic elastomer is preferably compounded as component (E) in order to improve the impact strength and flexibility of the resin composition of the present invention, in a quantity within the range from 1 to 100 parts by weight with respect to 100 parts by weight of PPE group resin or the combination of PPE group resin and the aromatic vinyl group resin of component (A).

Examples of the thermoplastic elastomer that can be used in the resin composition of the present invention include styrene group thermoplastic elastomer, polyolefin group thermoplastic elastomer, polyester group thermoplastic elastomer, etc., however, it is preferred to use hydrogenated block copolymers of styrene and butadiene or hydrogenated block copolymers of styrene and isoprene.

Details regarding the hydrogenated styrene group block copolymer are presented below. The hydrogenated styrene group block copolymer that is preferably used as the component (E) of the present invention is the material obtained by hydrogenating the block copolymer formed from the polymer block A having at least 2 units of vinyl aromatic compound as its main constituent, and polymer block B having at least 1 unit of conjugated diene compound, as its main constituent. For example, it is the hydrogenation product of vinyl aromatic compound—conjugated diene compound block copolymer possessing the structure such as A-B-A, B-A-B-A, $(A-B)_4$-Si, A-B-A-B, etc.

This hydrogenated block copolymer contains vinyl aromatic compound in a quantity within the range from 5 to 60% by weight, preferably in a quantity within the range from 10 to 50% by weight. Moreover, regarding the block structure, the polymer block A having vinyl aromatic compound as its main constituent possesses the copolymer block structure of vinyl aromatic compound containing vinyl aromatic compound polymer block or vinyl aromatic compound in a quantity exceeding 50% by weight, preferably more than 70% by weight, and hydrogenated conjugated diene compound. Moreover, the polymer block B having hydrogenated conjugated diene copolymer as its main constituent possesses the copolymer block structure of hydrogenated conjugated diene compound containing hydrogenated conjugated diene compound polymer block or hydrogen added conjugated diene compound, in a quantity exceeding 50% by weight, preferably more than 70% by weight, and vinyl aromatic compound.

Also, in case of these polymer block A having vinyl aromatic compound as its main constituent and polymer block B having hydrogenated conjugated diene compound as its main constituent, distribution of vinyl aromatic compound or hydrogenated conjugated diene compound in the molecular chain occurring in the respective polymer block can be random, tapered (material in which monomer situated in the molecular chain has been increased or decreased), partial block form, or a desired combination of these. Furthermore, in the case of more than 2 units of the respective polymer block A having vinyl aromatic compound as its main constituent and polymer block B having hydrogenated conjugated diene compound as its main constituent mentioned above, each of the polymer blocks can have identical structure or different structure respectively.

As regards the vinyl aromatic compound used to prepare the hydrogenated copolymer, one or two or more than two types can be chosen from styrene, alpha-methyl styrene, vinyl toluene, p—tertiary butyl styrene, and among these examples, styrene is preferred. Also, as regards the conjugated diene compound before carrying out hydrogenation that composes the hydrogenated conjugated diene compound, one or two or more than two types can be chosen from butadiene, isoprene, 1,3-pentadiene, 2,3-dimethyl-1,3-butadiene, etc., with butadiene, isoprene, and their combination being preferred. Moreover, in case of the polymer block having conjugated diene compound before carrying out hydrogenation as its main constituent, its microstructure occurring in its block can be chosen as desired. For example, in a polybutadiene block, 1,2-microstructure is preferably within the range from 20 to 50%, more preferably within the range from 25 to 45%.

Also, the number-average molecular weight of the hydrogenated styrene group block copolymer possessing the structure mentioned above that is supplied to the present invention is desired to be within the range from 5,000 to 1,000,000, preferably within the range from 10,000 to 800,000, more preferably within the range from 30,000 to 500,000. The molecular weight distribution ratio (Mw/Mn) of weight average molecular weight (Mw) and number-average molecular weight (Mn) is preferably less than 10. Furthermore, the molecular structure of the hydrogenated block copolymer can be straight chain, branched, radiated form or a combination thereof.

Manufacturing methods for these block copolymers are known in the art. For example, in Japanese Patent Publication No. Sho 40-23798, lithium catalyst, etc., is used and vinyl aromatic compound—conjugated diene compound block copolymer is synthesized in an inert solvent, and next, as regards the manufacturing method of hydrogenated material of this vinyl aromatic compound—conjugated diene compound block copolymer, methods described in Japanese Patent Publication Nos. Sho 42-8704 and Sho 43-6636 can be used. However, particularly, the hydrogenated block copolymer synthesized using a titanium group hydrogenation catalyst is preferred, as the resulting hydrogen added block copolymer exhibits excellent characteristics such as weatherability and heat resistance. For example, the hydrogenated block copolymer of the present invention can be synthesized by carrying out hydrogenation in an inert solvent, in the presence of the titanium group hydrogenation catalysts as described in Japanese Patent Publication Nos. Sho 59-133203 and Sho 60-79005.

It is presently preferred that the hydrogenated block copolymer has at least 80% of hydrogenation of the aliphatic double bond based on conjugated diene compound, so that the polymer block having conjugated diene compound has its main constituent can be structurally converted into a polyolefin-type compound polymer block. Also, there is no particular restriction on the extent of hydrogenation of aromatic double bonds from the vinyl aromatic compound, however, it is preferably less than 20%. The quantity of unhydrogenated aliphatic double bond contained in the hydrogenated block copolymer mentioned above can be easily determined by infrared spectrophotometry, nuclear magnetic resonance spectroscopy, etc.

(6) Additives

Conventional additives other than the components (A) to (D) mentioned above, and further, other than the component (E), can also be added to the resin composition of the present invention at the time of mixing the resin composition or at the time of molding as long as the material characteristics of the composition are not lost. Examples of such additives include cosmetics, dyestuffs, flame retardant synergists, reinforcing fillers (glass fiber, carbon fiber, whisker), fillers (carbon black, silica, titanium oxide, mica, talc, calcium carbonate, potassium titanate, wollastonite, etc.), stabilizers, antioxidants, weatherability agents, ultraviolet light absorbers, photostabilization reagents, lubricants, mold releasing agents (mold lubricants), nucleating agents, plasticizers (oil, low molecular weight polyethylene, epoxidated soybean oil, polyethylene glycol, fatty acid ester, etc.), melt flow modulators, antistatic reagents, compatibilizers (dicarboxylic acids such as maleic anhydride, citric acid, etc. as well as their anhydrides, etc.), fungicide, etc.

Photostabilization reagents and ultraviolet light absorbers such as hindered phenols, benzoate compounds, benzotriazoles, benzophenones, or formamidine compounds, etc., are effective for imparting and improving weatherability. Also, nucleating agents such as inorganic compounds including talc, or organic compounds such as metal salts of aromatic carboxylic acids, sorbitol compounds, or aromatic phosphoric acid metal salts, etc. are effective for imparting and improving rigidity and anti-damage characteristics.

(7) Manufacturing Method of Resin Composition as Well as Molded Material

There is no particular restriction on the method that may be used for the manufacture of the resin composition of the present invention, and it can be manufactured using all the components mentioned above by different methods. However, melt mixing methods are particularly preferred. A solvent can also be added in a small quantity at the time of carrying out melt kneading, however, generally it is not required. Examples of melt kneading devices include single-screw extruders, twin-screw extruders, Banbury mixers, roll mixers, kneaders, Brabender plasto-graph, etc. However, melt kneading using a twin-screw extruder is the most preferred. There is no particular restriction over the melt kneading temperature, however, usually it is within the range from 150° C. to 350° C.

The resin composition of the present invention thus obtained is used and it is covered on a conductor such as copper wire etc. after which wire cable is molded by extrusion.

The flame retardant resin composition used in wire cable covering material of the present invention has been explained below in further detail with the help of practical examples. However, the present invention is not restricted only to these practical examples.

EXAMPLES 1–3, COMPARATIVE EXAMPLES 1 AND 2

The following compounds were used in the practical examples.

Component (A): PPE group resin (A-1): Poly(2,6-dimethyl-1,4-phenylene ether) having an intrinsic viscosity (chloroform, 30° C.) of 0.12 dl/g (trademark SA 120, Nippon GE Plastics Kabushiki Kaisha), PPE group resin (A-2): Poly(2,6-di methyl-1,4-phenylene ether) having intrinsic viscosity (chloroform, 30° C.) of 0.46 dl/g (trademark PPO 646, Nippon GE Plastics Kabushiki Kaisha), Aromatic vinyl group resin: High impact polystyrene (HIPS) (trademark Topolex 876-HF, Mitsui Kagaku Kabushiki Kaisha)

Component (B): Phosphate ester flame retardant (B-1) TPP: Triphenyl phosphate (Daihatsu Kagaku Kabushiki Kaisha), Phosphate ester flame retardant (B-2): Compound shown by the formula (i) given below, here, mixture of r=1 to 10 (trademark CR733S, Daihatsu Kagaku Kabushiki Kaisha),

[Formula 3]

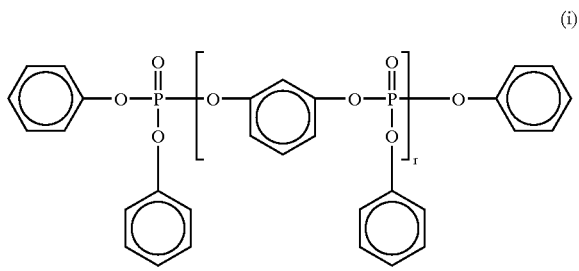

Halogenated polystyrene: Brominated polystyrene (trademark PYRO-CHEK68PBC, Albemarle Asano Kabushiki Kaisha), Component (C): Boron phosphate (Yonehama Kagaku Kogyo Kabushiki Kaisha), Component (D): Zinc boron hydrate (Mitsuyo Kasei Kabushiki Kaisha), Tetrafluoroethylene: (trademark FR104M-B, SHANG-HAI 3F Kabushiki Kaisha), Component (E): Thermoplastic elastomer: Polystyrene-poly(ethylene-butylene)-polystyrene (SEBS) (trademark Kraton G1650, Shell Chemical Kabushiki Kaisha).

All of the components were melt kneaded in the proportions given in table 1 (parts by weight) to form pellets using a 30 mm twin-screw extruder with a kneading temperature of 280° C. and a screw rotation rate of 280 rpm. These pellets were used and test plates were prepared by injection molding at a temperature of 260° C. and a metallic mold temperature of 80° C. Test plates were evaluated and the results are presented in table 1, below.

In comparative example 1, boron phosphate and zinc borate hydrate were not used. In comparative example 2, halogenated polystyrene was used instead of phosphate ester flame retardant component (B), and tetrafluoroethylene was used instead of boron phosphate and zinc borate hydrate.

Measurement methods used for characteristic evaluation have been presented below.

(1) Thermal deformation temperature (heat distortion temperature; HDT) was measured as per ASTM D648 using a test plate having thickness of ¼ inch at a load of 18.6 kg/cm.

(2) Melt flow index (MFI) was measured as per ASTM D1238 at 250° C. and at the load of 10 kg/cm².

(3) Combustion test: VB (vertical burning) was carried out as per combustion test indicated in Bleten 94 "Combustion test for material classification" of the Under Writer Laboratory Incorporated (known as the UL-94 test) using 5 units of test plates (test plates having a thickness of ¹⁄₁₆ inch (1.6 mm)). If the material had a combustion time within 10 seconds and the ignited cotton did not drip, it was evaluated as "satisfactory" in Table 1; if the ignited cotton dripped, it was evaluated as "Presence of drip" in Table 1.

(4) Izod impact strength (IZOD): The measurements were carried out as per ASTM D256 at 23° C. using a notched test plate having thickness of ⅛ inch.

(5) Tensile strength (TS): Measurement was carried out as per ASTM D638.

(6) Tensile elongation (TE): Measurement was carried out as per ASTM D638.

(7) Degree of environmental load: At the time of the combustion test, the material not forming harmful substance that exerts bad influence on the environment or the human body was judged as "o", and the material forming harmful substance that exerts bad influence on the environment or the human body was judged as "X".

TABLE 1

| | | Practical example 1 | Practical example 2 | Practical example 3 | Comparative example 1 | Comparative example 2 |
|---|---|---|---|---|---|---|
| Component (A) | PPE (A-1) | 55 | | | | |
| | PPE (A-2) | | 55 | 55 | 55 | 55 |
| | Styrene group resin (HIPS) | 45 | 45 | 45 | 45 | 45 |
| Component (B) | TPP(B-1) | 15 | 15 | | 15 | |
| | CR7335 (B-2) | | | 15 | | |
| | Halogenated polystyrene | | | | | 10 |
| Component (C) | Boron phosphate | 1 | 1 | 1 | | |
| Component (D) | Zinc borate hydrate | 0.5 | 0.5 | 0.5 | | |
| | Tetrafluoroethylene | | | | | 0.1 |
| Component (E) | SEBS | 5 | 5 | 5 | 5 | 5 |
| Evaluation index | HDT(° C.) | 80 | 90 | 95 | 90 | 120 |
| | MFI (g/10 minutes) | 25 | 16 | 10 | 18 | 8 |
| | Combustion test | Satisfactory | Satisfactory | Satisfactory | Presence of drip | Satisfactory |
| | IZOD (kg.cm/cm) | 18 | 23 | 20 | 22 | 28 |
| | TS (kg/cm²) | 400 | 470 | 500 | 510 | 580 |
| | TE( kg/cm²) | 30 | 50 | 45 | 38 | 60 |
| | Degree of environmental load | o | o | o | o | X |

The invention provides a flame retardant resin composition that has excellent flame retardance using non-halogenated compounds, especially in the absence of explosion at the time of combustion or dripping of the resin The composition further provides satisfactory melt behavior and excellent processability, heat resistance, impact strength, and flexibility. It is extremely useful as a wire and cable covering material.

What is claimed is:

1. A thermoplastic composition, comprising:
   100 parts by weight of a resin component comprising a polyphenylene ether group resin, or a polyphenylene ether group resin in combination with an aromatic vinyl group resin;
   2 to 30 parts by weight of a phosphate ester flame retardant;
   0.1 to 20 parts by weight of boron phosphate;
   0.1 to 10 parts by weight of zinc borate hydrate; and 1 to 100 parts by weight of a thermoplastic elastomer selected from the group consisting of polyolefin group thermoplastic elastomer and polyester group thermoplastic elastomer.

2. The thermoplastic composition of claim 1, wherein the polyphenylene ether group resin is a poly(2,6-dimethyl-1,4-phenylene ether) having an intrinsic viscosity of 0.08 to 0.60 measured at 30° C. in chloroform.

3. The thermoplastic composition of claim 1, wherein the polyphenylene ether group resin is a copolymer comprising 2,3,6-trimethyl-1,4-phenylene ether units.

4. The thermoplastic composition of claim 1, wherein the aromatic vinyl group resin is a homopolymer or copolymer of styrene, alpha-methyl styrene, alpha-methyl-p-methyl styrene, chlorostyrene, or bromostyrene.

5. The thermoplastic composition of claim 1, wherein the aromatic vinyl group resin in a high-impact polystyrene comprising 70 to 99% by weight polystyrene and 1 to 30% by weight of a diene rubber.

6. The thermoplastic composition of claim 1, wherein the resin component, comprises 1 to 99 parts by weight of the polyphenylene ether group resin and 99 to 1 parts by weight of the aromatic vinyl group resin.

7. The thermoplastic composition of claim 1, wherein the phosphate ester flame retardant is an aromatic phosphate ester.

8. A thermoplastic composition, comprising:
   100 parts by weight of a resin component comprising 20 to 80 parts by weight a polyphenylene ether group resin and 80 to 20 parts by weight of an aromatic vinyl group resin;
   5 to 25 parts by weight of an aromatic phosphate ester flame retardant;
   0.5 to 10 parts by weight of boron phosphate;
   0.5 to 10 parts by weight of zinc borate hydrate; and
   1 to 100 parts by weight of a thermoplastic elastomer selected from the group consisting of polyolefin group thermoplastic elastomer and polyester group thermoplastic elastomer.

9. An article comprising the composition of claim 8.

* * * * *

UNITED STATES PATENT AND TRADEMARK OFFICE
CERTIFICATE OF CORRECTION

PATENT NO. : 6,838,503 B2
DATED : January 4, 2005
INVENTOR(S) : Ming Yin et al.

It is certified that error appears in the above-identified patent and that said Letters Patent is hereby corrected as shown below:

Column 1,
Line 48, after "is" insert -- a --.

Column 7,
Line 46, after "compound" delete "has" and insert -- as --.

Column 9,
Line 38, in the table, delete "CR7335(B-2" and insert -- CR733S(B-2) --.

Column 10,
Line 53, after "resin" insert -- . --.

Column 12,
Line 8, after "weight" insert -- of --.

Signed and Sealed this

Thirty-first Day of January, 2006

JON W. DUDAS
*Director of the United States Patent and Trademark Office*

UNITED STATES PATENT AND TRADEMARK OFFICE
CERTIFICATE OF CORRECTION

PATENT NO. : 6,838,503 B2  Page 1 of 1
APPLICATION NO. : 10/186134
DATED : January 4, 2005
INVENTOR(S) : Ming Yin et al.

It is certified that error appears in the above-identified patent and that said Letters Patent is hereby corrected as shown below:

<u>Title Page,</u>
Item (73) Assignee, after "Electric", delete "Compa" and insert therefor --Company--, and
Item (73) Assignee, delete "Pittsfield, MA, and insert therefor --Schenectady, NY--.

Signed and Sealed this

Fourteenth Day of November, 2006

JON W. DUDAS
*Director of the United States Patent and Trademark Office*